US010587929B2

(12) United States Patent
Husain et al.

(10) Patent No.: US 10,587,929 B2
(45) Date of Patent: Mar. 10, 2020

(54) SELECTING CONTENT ITEMS FOR PRESENTATION IN CONJUNCTION WITH VIDEO CONTENT PRESENTED TO A USER BASED ON OBJECTS IDENTIFIED IN THE VIDEO CONTENT

(71) Applicant: Facebook, Inc., Menlo Park, CA (US)

(72) Inventors: Aliasgar Mumtaz Husain, Milpitas, CA (US); Sung-eok Jeon, Bellevue, WA (US); Kevin Russell Wheeler, London (GB)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/171,473

(22) Filed: Jun. 2, 2016

(65) Prior Publication Data
US 2017/0353769 A1  Dec. 7, 2017

(51) Int. Cl.
*H04N 21/482* (2011.01)
*H04N 21/258* (2011.01)
*H04N 21/262* (2011.01)
*H04N 21/234* (2011.01)
*H04N 21/81* (2011.01)

(52) U.S. Cl.
CPC ..... *H04N 21/482* (2013.01); *H04N 21/23418* (2013.01); *H04N 21/25891* (2013.01); *H04N 21/26258* (2013.01); *H04N 21/812* (2013.01)

(58) Field of Classification Search
None
See application file for complete search history.

(56) References Cited

U.S. PATENT DOCUMENTS

| 2001/0013125 | A1* | 8/2001 | Kitsukawa | G06Q 30/02 725/36 |
| 2013/0268973 | A1* | 10/2013 | Archibong | G06Q 50/01 725/51 |
| 2014/0259045 | A1* | 9/2014 | Sangal | H04N 21/812 725/23 |
| 2014/0359647 | A1* | 12/2014 | Shoemake | H04N 5/23206 725/10 |
| 2015/0199727 | A1* | 7/2015 | Naveh | G06Q 30/0269 705/14.66 |
| 2016/0300259 | A1* | 10/2016 | Bashetty | G06Q 30/0242 |

* cited by examiner

*Primary Examiner* — Nathan J Flynn
*Assistant Examiner* — Christen A Kurien
(74) *Attorney, Agent, or Firm* — Fenwick & West LLP

(57) ABSTRACT

An online system receives content items including targeting criteria and associated with objects presented via video content. When the online system presents video content to a user, the online system detects objects included in the video content. If the online system detects an object in the video content matching an object associated with a content item, the online system determines whether characteristics of the user satisfy at least a threshold amount of targeting criteria included in the content item. In response to characteristics of the user satisfying the threshold amount of targeting criteria included in the content item, the online system includes the content item in one or more selection processes. If the selection processes select the content item, the online system presents the content item in conjunction with the video content.

17 Claims, 4 Drawing Sheets

SELECTING CONTENT ITEMS FOR PRESENTATION IN CONJUNCTION WITH VIDEO CONTENT PRESENTED TO A USER BASED ON OBJECTS IDENTIFIED IN THE VIDEO CONTENT

BACKGROUND

This disclosure relates generally to online systems, and more specifically to identifying content for presentation to users of an online system based on objects identified from video content presented to the users.

An online system, such as a social networking system, allows users to connect to and to communicate with other users of the online system. Users create profiles on an online system that are tied to their identities and include information about the users, such as interests and demographic information. The users may be individuals or entities such as corporations or charities. Content items are presented to various users by the online system to encourage users to interact with the online system.

Many online systems receive video content for presentation to users of the online system. Further, other types of content items received by an online system for presentation may be related to video content presented to a user by the online system. For example, content items may provide additional information about people, places, or things included in video content. However, conventional online systems are unable to identify content items related to, or associated with, video content without receiving an explicit relationship between the content items and the video content from users from whom the online system obtains the content items or the video content. This may reduce user interaction with conventional online systems by failing to present content items along with video content including objects related to the content items, which may increase a likelihood of the user interacting with the content items or with the video content. If an online system receives compensation in exchange for user interaction with content items that are related to objects in video content, failing to present the content items in conjunction with the video content may reduce the revenue obtained by the online system.

SUMMARY

An online system receives various content items for presentation to one or more users by the online system. Content items may be received from users of the online system or from third party systems that exchange content with the online system. Various content items received by the online system include one or more targeting criteria that specify characteristics of users of the online system who are eligible to be presented with the content items. For example, a user with whom the online system associates characteristics that satisfy at least a threshold number of targeting criteria included in a content item is eligible to be presented with the content item, while another user with whom the online system associates characteristics that do not satisfy at least a threshold number of targeting criteria included in the content item is not eligible to be presented with the content item.

Additionally, a content item is associated with a particular object capable of being presented by video content. For example, the particular object is a good or a service described by the content item or related to the content item, and the content item includes information identifying the good or the service from video or image content. As another example, the particular object is a logo or name of a company, a person, or a brand, and the content item includes information used to identify the logo or the name from video or image content (e.g., an image of the logo or the name). In another example, the particular object is a person or a landmark, and the content item includes information capable of identifying the person or the landmark from video or image content (e.g., an image of the person's face, characteristics of the person's face, an image of the landmark, characteristics of the landmark). As an additional example, the particular object is audio data (e.g., a song, a podcast, an interview, etc.) and the content item includes information used to identify the audio data from other audio (e.g., a fingerprint of the audio data, a portion of the audio data). Various content items received by the online system may be associated with different objects.

Additionally, the content item may identify an amount of the particular object visible in video content for the particular object to be considered presented by the video content. For example, the content item identifies a minimum percentage of the object visible in video content for the video content to be determined to present the particular object. In some embodiments, the content item specifies a minimum duration for the video content to present the particular object.

The online system also obtains video content for presentation one or more users of the online system. In some embodiments, the obtained video content is being presented to users of the online system (i.e., the video content is being presented live to the online system users). Alternatively, the obtained video content was presented to users of the online system. The video content may be obtained from content stored by the online system or received by the online system. Alternatively, the online system obtains the video content from third party system that provides content to users of the online system. Any suitable type of video content may be obtained by the online system. Example types of video content include two-dimensional video data, three dimensional video data, data for generating virtual reality content (e.g., 360-degree content), and data for generating augmented reality content (e.g., combining data with video data of an environment surrounding a user).

An identifier of a user or a third party system from which the online system obtained the video content may be obtained by the online system along with the video content in various embodiments. Additionally, one or more permissions may be associated with the video content by the user or the third party system who generated or who provided the video content to the online system. Permissions associated with the video content may regulate users of the online system who are capable of accessing the video content.

The online system detects objects included in the video content by applying one or more methods to the video content to detect objects in the video content. For example, the online system applies one or more image processing methods to the video content to extract objects in various frames of the video content. The online system may compare the extracted objects to information maintained by the online system identifying objects to detect objects included in the video content. For example, the online system compares an extracted object to stored image data the online system associates with an object, if the extracted object matches the stored image data, the online system detects that the video content includes the object. Additionally, the online system may apply one or more audio processing methods to the video content to identify objects in the video content. For example, the online system compares portions of audio in the video content to stored audio data associated with various objects by the online system. Objects associated with audio data matching one or more portions of audio in the video content are detected as included in the video data. In other embodiments, the online system applies one or more image processing methods and detects objects that the one or more image processing methods extract from characteristics of various frames of the video content; similarly, the online system applies one or more audio processing methods to the video content and detects objects that the one or more audio processes identify from audio in the video data.

In some embodiments, the online system determines whether the video content is publicly accessible prior to detecting objects in the video content and detects objects in the video content in response to determining the video content is publicly accessible. If the online system determines the video content is not publicly accessible, the online system does not detect objects in the video content. The online system determines whether the video content is publicly accessible based on characteristics of the video content or characteristics of the user or of third party system from whom the online system obtained the video content. For example, the online system determines the video content is publicly accessible if the video content has been viewed at least a threshold number of times by online system users. As another example, the online system determines the video content is publicly accessible if a user who provided the video content (i.e., a providing user) has authorized at least a threshold number of users to access video content provided to the online system by the providing user.

The online system stores identifiers of objects detected in the video content in association with the video content for subsequent retrieval or stores other information identifying objects detected from the video content. In some embodiments, the stored information is identifiers associated with objects maintained by the online system. Alternatively, the stored information is images captured from the video content or portions of audio form the video data that the online system stores in association with the video content.

When the online system selects the video content for presentation to a user of the online system, the online system determines whether the video content includes the particular item included in the content item. The online system may select the video content for presentation to the user if the user requests the video content from the online system. Alternatively, the online system applies one or more selection processes to various content items, including the video content when the user requests content from the online system, and one or more of the selection processes selects the video content for presentation to the user.

In various embodiments, the online system compares stored information identifying objects detected from the video content with information identifying the particular object associated with the content item to determine whether the video content includes the object associated with the content item. If stored information identifying an object from the video content matches information identifying the particular object associated with the content item, the online system determines the video content includes the particular object associated with the content item. For example, the online system compares characteristics of an object detected from the video content to information identifying the particular object associated with the content item and determines a likelihood that the detected object matches the object associated with the content item. If the likelihood equals or exceeds a threshold value, the online system determines the video content includes the particular object associated with the content item. The threshold value may be included in the content item when it is received by the online system, or the online system determines the threshold value based on information maintained by the online system.

In response to determining the video content includes the particular object associated with the content item, the online system determines whether characteristics associated with the user satisfy at least a threshold amount of targeting criteria included in the content item. If characteristics associated with the user satisfy at least the threshold amount of targeting criteria included in the content item, the online system includes the content item in one or more selection processes selecting content for presentation to the user in conjunction with the video content. If the one or more selection processes select the content item, the online system communicates the content item to a client device for presentation to the user in conjunction with the video content.

In various embodiments, the content item is communicated to the client device for presentation at a time, or at times, when the video content presents the object associated with the content item. The content item may specify a threshold percentage of the object associated with the content item that is visible via the video content for the object to be presented by the video content, so the content item is presented in conjunction with the video content at a time when the video content presents at least the threshold percentage of the object associated with the content item is visible in the video content. In some embodiments, the content item specifies a minimum duration that the object associated with the content item is visible in the video data (or that at least a threshold percentage of the object associated with the content item) is presented by the video content, and the content item is presented in conjunction with the video content when the video content presents the object associated with the content item for at least the minimum duration.

For example, the content item is presented in conjunction with the video data at times when the object associated with the content item is visible in the video content. Alternatively, the content item is presented as an introduction prior to presentation of the video content or is presented after the video content has been presented to the user. If the video content is data for generating a virtual reality or an augmented reality environment, the content item may be presented when the object associated with the content item is within a field of view of the user within the virtual reality or the augmented reality environment, and not presented with the object is outside the field of view of the user within the virtual reality or the augmented reality environment.

The content item may be presented in conjunction with the content item in various ways. For example, the content item is presented in an interface that presents the video content. As an example, the interface presents the video content in a region and also presents the content item in another region, which may be within a threshold distance of the region presenting the video content or may be proximate to the region presenting the video content. Alternatively, the content item is overlaid on a portion of the video content when the video content is presented. For example, the client device overlays the content item on a portion of the video content proximate to the object associated with the content item in the video content at a time when the object associated with the content item is visible in the video content. In some embodiments, if the video content generates a virtual reality or an augmented reality environment, the user may interact with the content item via the virtual reality or the augmented reality environment when the content item is presented in the virtual reality environment or in the augmented reality environment.

To prevent the user from being presented with a large amount of content items in conjunction with video content, the online system maintains a minimum time interval between presenting content items associated with objects in video content in conjunction with video content. The online system identifies a time when the content item associated with the object in the video content was presented to the user in conjunction with the video content and waits at least the minimum time interval before including another content item associated with the object, or with another object, in the video content or in other video content in one or more selection processes for presentation in conjunction with the video content or with the other video content. Alternatively, online system identifies a time when the content item associated with the object in the video content was included in the one or more selection processes and waits at least the minimum time interval before including another content item associated with the object, or with another object, in other video content or in the video content in one or more selection processes for presentation to the user in conjunction with the video content or with the other video content.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
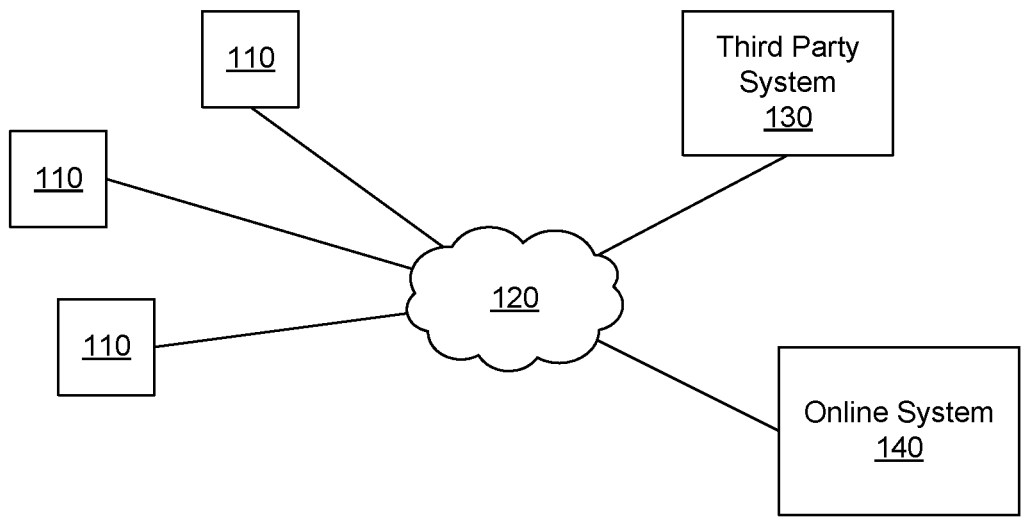
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130. In some embodiments, one or more of the third party systems 130 provide content to the online system 140 for presentation to users of the online system 140 and provide compensation to the online system 140 in exchange for presenting the content. For example, a third party system 130 provides content items associated with amounts of compensation provided by the third party system 130 to the online system 140 in exchange presenting the content items to users of the online system 140.

Figure 2:
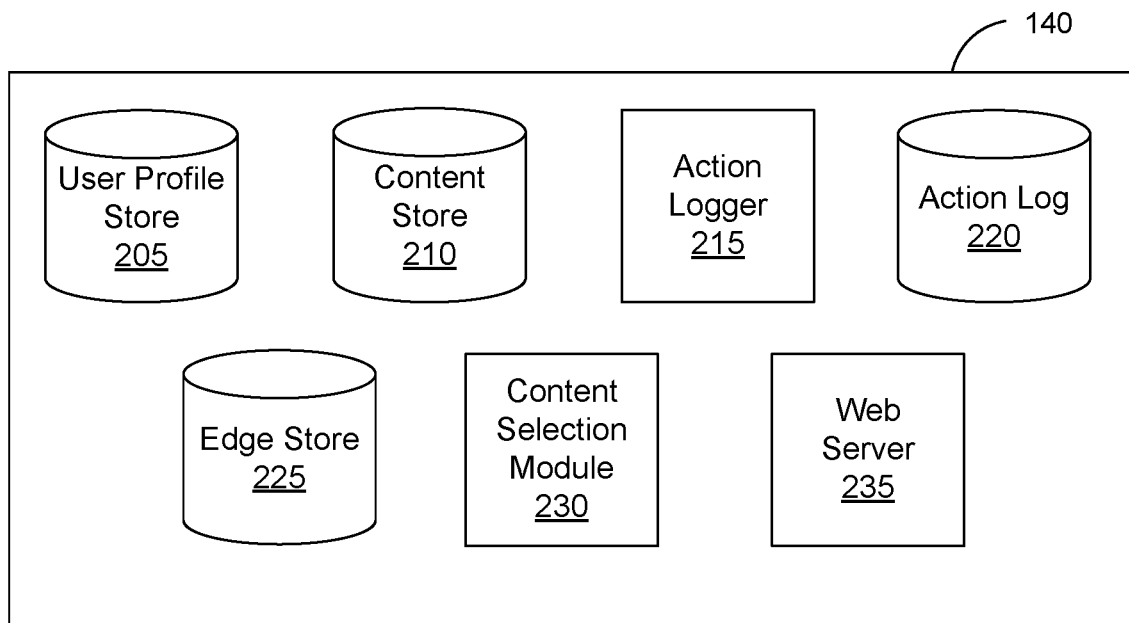
FIG. 2 is a block diagram of an online system, in accordance with an embodiment.

FIG. 2 is a block diagram of architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. An object stored in the content store 210 may be video content obtained by the online system 140 from a third party system 130, from a user of the online system 140, or generated by the online system 140. Video content included in the content store 210 may have any suitable format. For example, video content included in the content store 210 is information for the online system 140 to generate a virtual reality environment or an augmented reality environment (e.g., video content including 360 degree objects relative to a user). As another example, video content included in the content store 210 is two-dimensional video content for presentation by the online system 140. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also includes a landing page specifying a network address to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with content items on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, content items that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

Additionally, for at least some video content included in the content store 210, the content selection module 230 detects objects included in the video content. Objects may be goods or services, users, corporate logos, personal logos, brand logos, a landmark, a person, a song, a podcast, a person's voice, or any other suitable information. The content selection module 230 applies one or more methods to video content to detect objects included in the video content. For example, the content selection module 230 applies one or more image processing methods to identify goods included in one or more frames of the video data, to identify faces or facial features of users in frames of the video content, to identify text in frames of the video data, or to identify any other suitable information from the video data. The content selection module 230 may compare data identified from frames of the video data to detect objects corresponding to the data identified from frames of the video data. For example, the content selection module 230 compares products or goods identified from a frame of the video content to information accessible to the online system 140 identifying products or goods and detects products or goods corresponding to information accessible to the online system 140 matching products or goods identified form the frame of the video content. As another example, the content selection module 230 compares faces or facial features identified from a frame of the video data to faces or facial features associated with users of the online system and detects users associated with faces or facial features matching faces or facial features identified from a frame of the video data.

Similarly, the content selection module 230 compares logos or text (e.g., names, product identifiers, descriptions) identified from frames of the video content to information associated with brands, products, companies, or users and detects brands, products, companies, or users associated with information matching the logos or text identified from frames of the video content.

Similarly, the content selection module 230 extracts audio from the video content and compare the extracted audio data to audio associated with songs, podcasts, artists, or other users. The content selection module 230 detects songs, podcats, artists, or other users associated with audio matching audio extracted from the video content as included in the video content. The content selection module 230 stores information identifying objects detected in the video content in association with the video content. In some embodiments, the content selection module 230 stores information identifying objects detected in the video content in the content store 210 in association with the video content. Information identifying an object detected in the video content may identify a time in the video content when the object was detected, in some embodiments.

In some embodiments, the content selection module 230 determines whether video content is publicly accessible prior to detecting objects in the video content and detects objects in the video content in response to determining the video content is publicly accessible. If the content selection module 230 determines the video content is not publicly accessible, the content selection module 230 does not detect objects in the video content. The content selection module 230 determines whether the video content is publicly accessible based on characteristics of the video content or characteristics of the user or of third party system 130 from whom the online system 140 obtained the video content. For example, the content selection module 230 determines the video content is publicly accessible if the video content has been viewed at least a threshold number of times by online system users. Determination of whether video content is publicly accessible is further described below in conjunction with FIG. 3.

As further described below in conjunction with FIG. 3, the content selection module 230 may identify one or more content items associated with objects included in video content for presentation in conjunction with the video content. When the content selection module 230 selects video content for presentation to a user, the content selection module 230 compares objects detected in the video content with objects associated with content items included in the content store. If a content item is associated with an object detected in the video content and includes targeting criteria, the content selection module 230 determines if characteristics associated with the user satisfy at least a threshold amount of targeting criteria included in the content item. If characteristics associated with the user satisfy at least a threshold amount of targeting criteria, the content selection module 230 includes the content item in one or more selection processes that select content for presentation in conjunction with the video content. As further described below in conjunction with FIG. 3, if the content item is selected, it may be presented in various ways in conjunction with the video content.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
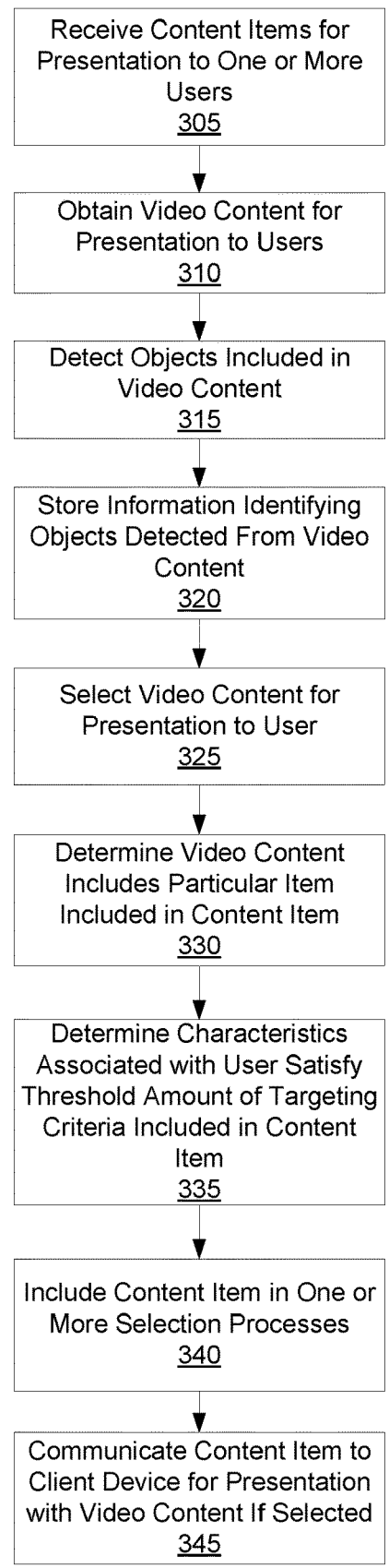
FIG. 3 is a flowchart of a method for selecting content for presentation to a user by an online system in conjunction with video content, in accordance with an embodiment.

Selecting Content for Presentation in Conjunction with Video Content Presented to a User FIG. 3 is a flowchart of one embodiment of a method for selecting content for presentation to a user by an online system 140 in conjunction with video content. In other embodiments, the method may include different and/or additional steps than those shown in FIG. 3. Additionally, steps of the method may be performed in different orders than the order described in conjunction with FIG. 3 in various embodiments.

An online system 140 receives 305 various content items for presentation to one or more users by the online system 140. A content item may be received 305 from a third party system 130 coupled to the online system 140, or may be received 305 from a user of the online system 140. Alternatively, the online system 140 retrieves content items from one or more third party systems 130 or other sources. The online system 140 may locally store received content items or may obtain content items from one or more third party systems 130. A content item received 305 by the online system 140 includes one or more targeting criteria that specify characteristics of users of the online system 140 who are eligible to be presented with the content item. For example, a user with whom the online system 140 associates characteristics that satisfy at least a threshold number of targeting criteria included in the content item is eligible to be presented with the content item. Conversely, another user with whom the online system 140 associates characteristics that do not satisfy at least a threshold number of targeting criteria included in the content item is not eligible to be presented with the content item. Hence, the targeting criteria identify an audience of users to whom the content item may be presented. A content item may include a bid amount specifying an amount of compensation received by the online system 140 from an entity associated with the content item in exchange for presenting the content item to one or more users.

Additionally, the content item is associated with a particular object capable of being presented by video content. For example, the particular object is a good or a service described by the content item or related to the content item, and the content item includes information identifying the good or the service from video or image content. As another example, the particular object is a logo or name of a company, a person, or a brand, and the content item includes information used to identify the logo or the name from video or image content. In another example, the particular object is a person or a landmark, and the content item includes information capable of identifying the person or the landmark from video or image content. As an additional example, the particular object is audio data (e.g., a song, a podcast, an interview, etc.) and the content item includes information used to identify the audio data from other audio. Various content items received 305 by the online system 140 may be associated with different objects.

Further, the online system 140 also obtains 310 video content for presentation to one or more users of the online system 140. For example, the video content is video content that was presented to users of the online system 140 or is video content being presented to users of the online system 140. The video content may be obtained 310 from content stored by the online system 140, or may be obtained 310 from a third party system 130 that provides content to users of the online system 140. Any suitable type of video content may be obtained 310 by the online system 140. Example types of video content include two-dimensional video data, three dimensional video data, data for generating a virtual reality data (e.g., 360-degree content), data for generating augmented reality combining data with video data of an environment surrounding a user. An identifier of a user or a third party system 130 generating or providing the video content may be obtained 310 by the online system 140 along with the video content in various embodiments. Additionally, one or more permissions may be associated with the video content by the user or the third party system 130 who generated or who provided the video content to the online system 140. Permissions associated with the video content may regulate users of the online system 140 who are capable of accessing the video content. For example, certain permissions allow any user of the online system 140 to access the video content, while other permissions limit access to the video content to users having one or more particular characteristics (e.g., users who have a connection via the online system 140 to the user who provided or generated the video content, users of the online system 140 associated with a particular geographic location). Accordingly, permissions associated with the video content regulate presentation of the video content to users by the online system 140.

The online system 140 applies one or more methods to the video content to detect 315 one or more objects included in the video content. For example, the online system 140 applies one or more image processing methods to the video content to extract objects in various frames of the video content. The online system 140 compares the extracted objects to information maintained by the online system 140 identifying objects to detect 315 objects included in the video content. For example, the online system 140 compares an extracted object to stored image data the online system 140 associates with an object, if the extracted object matches the stored image data, the online system 140 detects 315 the video content includes the object. Additionally, the online system 140 may apply one or more audio processing methods to the video content to identify objects in the video content. For example, the online system 140 compares portions of audio in the video content to stored audio data associated with various objects by the online system 140. Objects associated with audio data matching one or more portions of audio in the video content are detected 315 as included in the video data. In other embodiments, the online system 140 applies one or more image processing methods and detects 315 objects that the one or more image processing methods extract from characteristics of various frames of the video content; similarly, the online system applies one or more audio processing methods to the video content and detects 315 objects that the one or more audio processes identify from audio in the video data.

In some embodiments, the online system 140 determines whether the video content is publicly accessible prior to detecting 315 objects in the video content and detects 315 objects in the video content in response to determining the video content is publicly accessible. If the online system 140 determines the video content is not publicly accessible, the online system 140 does not detect objects 315 in the video content. Hence, the online system 140 may limit detection of objects in video content to video content that publicly accessible to multiple online system users 140.

The online system 140 may determine whether the video content is publicly accessible based on one or more characteristics of the video data or of a user or of a third party system 130 from which the video content was obtained 305. In one embodiment, the online system 140 determines the video content is publicly accessible if the video content has been viewed at least a threshold number of times by online system users. Alternatively, the online system 140 determines the video content is publicly accessible if the video content has been viewed by at least a threshold number of online system users. In other embodiments, the online system 140 determines the video content is publicly accessible if a user who provided the video content (i.e., a providing user) has globally authorized users of the online system 140 to access content provided to the online system 140 by the providing user or who has globally authorized users of the online system 140 to access video content provided to the online system 140 by the providing user. Similarly, the online system 140 determines the video content is publicly accessible if the providing user has authorized at least a threshold number of users to access video content provided to the online system 140 by the providing user. In other embodiments, the online system 140 determines the video content is publicly accessible if at least a threshold number of other users are connected to the providing user via the online system 140. Further, the online system 140 may determine whether the video content is publicly accessible based on permissions associated with the video content. The online system 140 determines the video content is publicly accessible if the permissions associated with the video content allow at least a threshold number of online system users to access the video content and determines the video content is not publicly accessible if the permissions associated with the video content do not allow at least the threshold number of online system users to access the video content.

The online system 140 stores 320 identifiers of objects detected 315 in the video content in association with the video content for subsequent retrieval or stores 320 other information identifying objects detected 315 from the video content. In some embodiments, the stored information is identifiers associated with objects maintained by the online system 140. Alternatively, the stored information is images captured from the video content or portions of audio form the video data that the online system 140 stores 320 in association with the video content.

When the online system 140 selects 325 the video content for presentation to a user of the online system 140, the online system 140 determines 330 whether the video content includes the particular item included in the content item. The online system 140 may select 325 the video content for presentation to the user if the user request the video content from the online system 140. Alternatively, the online system 140 applies one or more selection processes to various content items, including the video content, when the user requests content from the online system 140, and one or more of the selection processes selects 325 the video content for presentation to the user. Examples of selection processes are further described above in conjunction with FIG. 2.

In various embodiments, the online system 140 compares stored information identifying objects detected 315 from the video content with information identifying the particular object associated with the content item to determine 330 whether the video content includes the object associated with the content item. If stored information identifying an object from the video content matches information identifying the particular object associated with the content item, the online system 140 determines 330 the video content includes the particular object associated with the content item. For example, the online system 140 compares characteristics of an object detected 315 from the video content to information identifying the particular object associated with the content item and determines a likelihood that the detected object matches the object associated with the content item. If the likelihood equals or exceeds a threshold value, the online system 140 determines 330 the video content includes the particular object associated with the content item. A user from whom the online system 140 received 305 the content item may specified the threshold value for the likelihood of a detected object matching the particular object in the content item, in association with the content item, or in a user profile maintained for the user by the online system 140 in various embodiments. Alternatively, the online system 140 determines the threshold value for the likelihood of a detected object matching the particular object based on information maintained by the online system 140.

In response to determining 330 the video content includes the particular object associated with the content item, the online system 140 determines 335 whether characteristics associated with the user satisfy at least a threshold amount of targeting criteria included in the content item. As described above, if characteristics associated with the user satisfy at least the threshold amount of targeting criteria included in the content item, the user is eligible to be presented with the content item. Accordingly, in response to determining 335 characteristics associated with the user satisfy at least the threshold amount of targeting criteria included in the content item, the online system 140 includes 340 the content item in one or more selection processes selecting content for presentation to the user in conjunction with the video content. As further described above in conjunction with FIG. 2, the one or more selection processes may select one or more content items based on measures of relevance of the content items to the user. Further, if content items include bid amounts specifying amounts of compensation received by the online system 140 in exchange for presenting various content items to the user, the one or more selection processes may select one or more content items based on the bid amounts.

If the content item includes a bid amount used by the one or more selection processes or instructions for determining a bid amount, the online system 140 may account for characteristics of the obtained video content to modify or to determine the bid amount. For example, the online system 140 may determine the bid amount for the content item based on a number of users who are viewing the video content when the content item is included in the one or more selection processes or based on a number of users who previously viewed the video content within a threshold time interval of the time when the content item is included in the one or more selection processes. As another example, the online system 140 determines the bid amount based on a number of times the video content has been viewed within a threshold time interval of the time when the content item is included in the one or more selection processes. The bid amount may be directly related (e.g., proportional) to the number of users or to the number of times the video content has been viewed. Characteristics of the object accessible to the online system 140 may also be used to determine the bid amount for the content item. For example, the bid amount is based on a number of other users who have performed actions associated with the particular object (e.g., indicated a preference for the particular object, indicated a preference for other content items associated with the particular object). The bid amount may be directly related (e.g., directly proportional) to the number of other users who performed actions associated with the particular object or on the number of actions associated with the particular object.

If the one or more selection processes select the content item, the online system 140 communicates 345 the content item to a client device 110 for presentation to the user in conjunction with the video content. In various embodiments, the content item is communicated 345 to the client device 110 for presentation at a time, or at items, when the video content presents the object associated with the content item. The content item may specify a threshold percentage of the object associated with the content item that is visible via the video content for the object to be presented by the video content, so the content item is presented in conjunction with the video content at a time when the video content presents at least the threshold percentage of the object associated with the content item is visible in the video content. In some embodiments, the content item specifies a minimum duration that the object associated with the content item is visible in the video data (or that at least a threshold percentage of the object associated with the content item) is presented by the video content, and the content item is presented in conjunction with the video content when the video content presents the object associated with the content item for at least the minimum duration.

For example, the content item is presented in conjunction with the video data at times when the object associated with the content item is visible in the video content. Alternatively, the content item is presented as an introduction prior to presentation of the video content or is presented after the video content has been presented to the user. If the video content is data for generating a virtual reality or an augmented reality environment, the content item may be presented when the object associated with the content item is within a field of view of the user within the virtual reality or the augmented reality environment, and not presented with the object is outside the field of view of the user within the virtual reality or the augmented reality environment.

The content item may be presented in conjunction with the content item in various ways. For example, the content item is presented in an interface that presents the video content. As an example, the interface presents the video content in a region and also presents the content item in another region, which may be within a threshold distance of the region presenting the video content or may be proximate to the region presenting the video content. Alternatively, the content item is overlaid on a portion of the video content when the video content is presented. For example, the client device 110 overlays the content item on a portion of the video content proximate to the object associated with the content item in the video content at a time when the object associated with the content item is visible in the video content. In some embodiments, if the video content generates a virtual reality or an augmented reality environment, the user may interact with the content item via the virtual reality or the augmented reality environment when the content item is presented in the virtual reality environment or in the augmented reality environment. For example, interacting with the content item via the client device 110 causes the client device 110 to obtain additional information associated with the content item from the online system 140 or from a third party system 130 associated with the content item and to present the additional information.

To prevent the user from being presented with a large amount of content items in conjunction with video content, the online system 140 maintains a minimum time interval between presenting content items associated with objects in video content in conjunction with video content. The online system 140 identifies a time when the content item associated with the object in the video content was presented to the user in conjunction with the video content and waits at least the minimum time interval before including another content item associated with the object, or with another object, in the video content or in other video content in one or more selection processes for presentation in conjunction with the video content or with the other video content. Alternatively, online system 140 identifies a time when the content item associated with the object in the video content was included 340 in the one or more selection processes and waits at least the minimum time interval before including another content item associated with the object, or with another object, in other video content or in the video content in one or more selection processes for presentation to the user in conjunction with the video content or with the other video content. In various embodiments, the online system 140 associates the minimum time interval with the user and determines the minimum time interval based on prior interactions with content items and video content by the user. Hence, the online system 140 may associate different minimum times with different users, so content items associated with objects in video content may be presented to different users at different intervals or with different frequencies.

Figure 4:
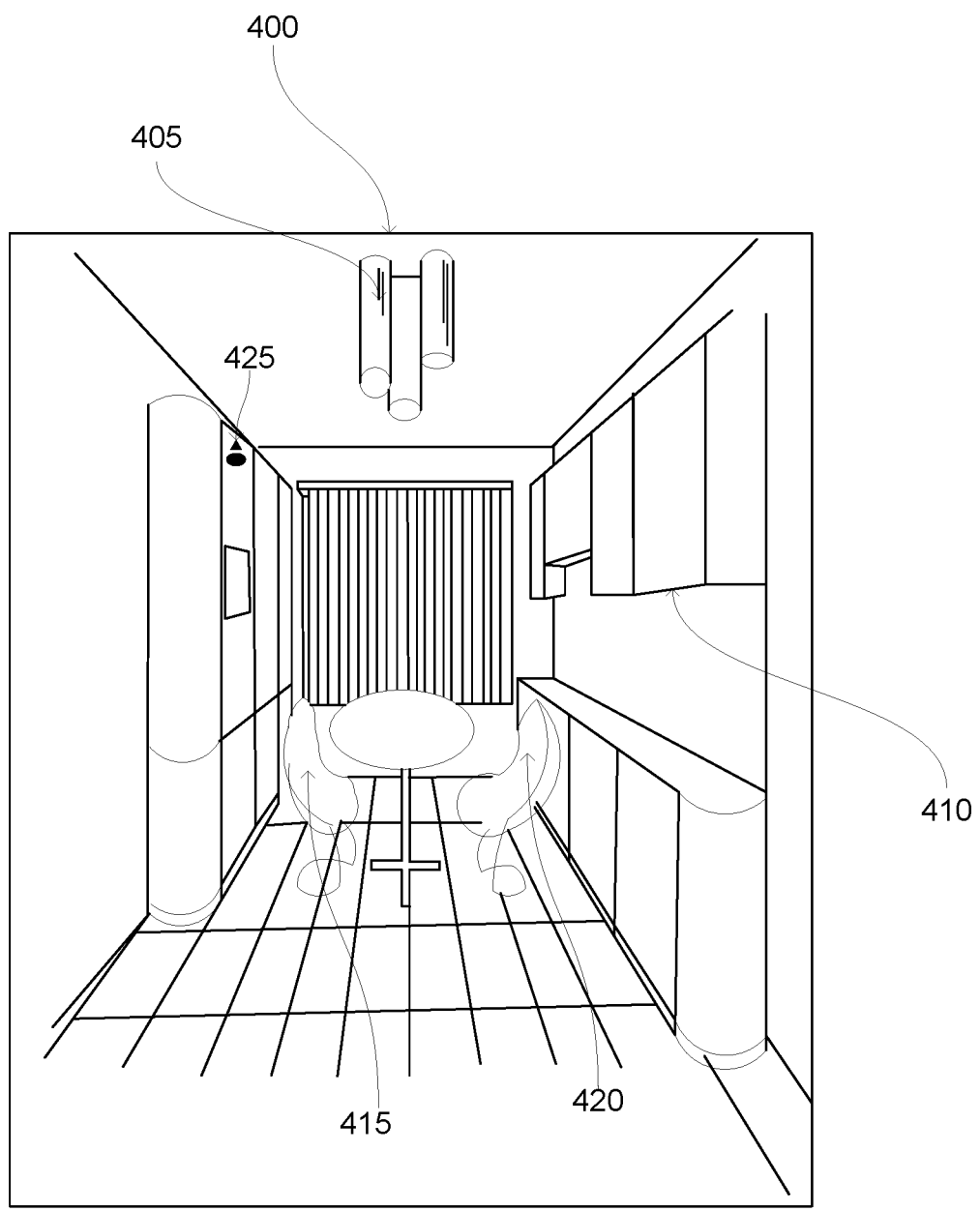
FIG. 4 is an example frame of video content including one or more objects presented by an online system, in accordance with an embodiment.

FIG. 4 is an example of a frame 400 of video content including various objects for presentation to users of the online system 140. In the example of FIG. 4, the frame 400 depicts a room presented a user. The frame 400 includes various objects 405, 410, 415, 420, 425 that are presented to the user. Objects 405, 410, 415, 420, 425 are products that the online system 140 identifies by applying one or more image processing methods to the frame 400. For example, objects 405, 410, 415, 420 are products for which portions of the frame 400 extracted by an image processing method match (or have at least a threshold likelihood of matching) information describing the products accessible to the online system 140. In the example of FIG. 4, object 425 identifies a brand or a company that the online system 140 associates with a logo matching a portion of the frame 400 that one or more image processing methods extracted from the frame 400.

Figure 5:
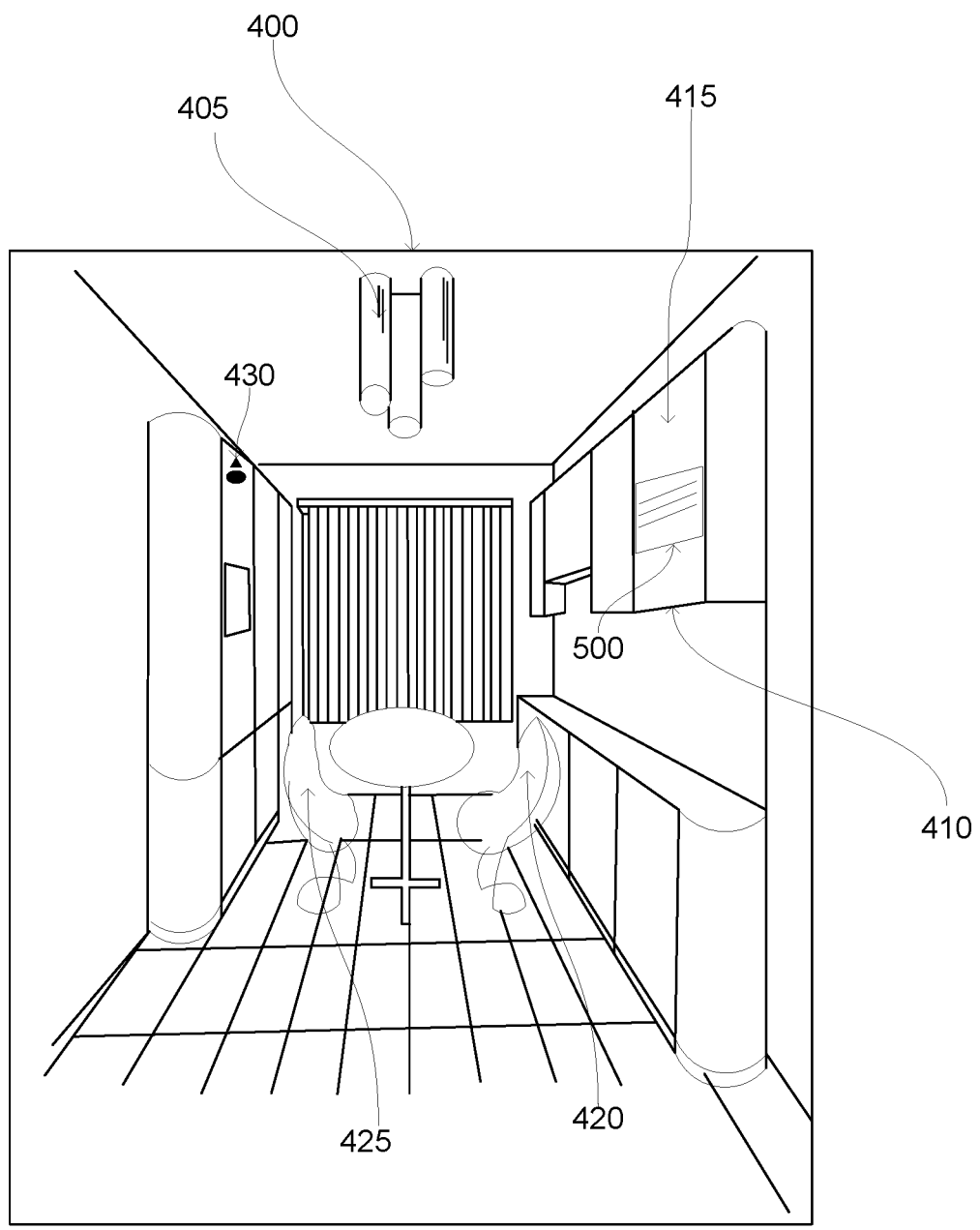
FIG. 5 is an example frame of video content including a content item associated with an object included in the frame that is presented in conjunction with the video content, in accordance with an embodiment.

FIG. 5 is an example of presenting a content item associated with an object detected from the frame 400 of video content in conjunction with the video content. In the example of FIG. 5, the content item 500 is associated with object 415, includes at least a threshold amount of targeting criteria satisfied by characteristics associated with a user to whom video content including the frame 400 is presented, and is selected as further described above in conjunction with FIG. 3. FIG. 5 shows an example where the content item 500 is overlaid on a portion of the frame 400, such as a portion of the object 415. In some embodiments, the content item 500 is overlaid on the object 415 for a duration specified in the content item 500. In other embodiments, the content item 500 is presented in a portion of an interface that presents the frame 400 of the video content. For example, the content item 500 is presented in a region of the interface that is proximate to the video content at a time when the frame 400 including the object 415 is presented.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving a content item for presentation by an online system, the content item associated with a particular object and targeting criteria identifying users of the online system eligible to be presented with the content item;
   obtaining, at the online system, video content for presentation to one or more users of the online system;
   detecting one or more objects included in the video content by the online system extracting objects included in frames of the video content and comparing the extracted objects to information maintained by the online system identifying objects;
   storing information identifying one or more objects extracted from frames of the video content by the online system;
   selecting the video content for presentation to a user of the online system;
   determining the video content includes the particular object in response to the stored information identifying the one or more objects extracted from frames of the video content by the online system matching information identifying the particular object;
   determining the user has characteristics satisfying at least a threshold amount of the targeting criteria associated with the content item; and
   including the content item in one or more selection processes performed by the online system selecting content for presentation to the user in conjunction with the video content in response to the determination the video content includes the particular object in response to stored information identifying the one or more objects extracted from frames of the video content matching information identifying the particular object and to the determination the user has characteristics satisfying at least a threshold amount of the targeting criteria associated with the content item, the one or more selection processes determining a measure of relevance of the content item to the user based on characteristics of the user maintained by the online system and based on the user's affinity for content items determined by the online system; and communicating the content item to the client device for presentation to the user in conjunction with the video content at times when the particular object is visible in the video content in response to the one or more selection processes performed by the online system determining the content item has at least a threshold measure of relevance to the user.

2. The method of claim 1, wherein communicating the content item to the client device for presentation to the user in conjunction with the video content in response to the one or more selection processes performed by the online system determining the content item has at least a threshold measure of relevance to the user comprises:

communicating the content item to the client device for presentation as an overlay on a portion of the video content.

3. The method of claim 1, wherein communicating the content item to the client device for presentation to the user in conjunction with the video content in response to the one or more selection processes performed by the online system determining the content item has at least a threshold measure of relevance to the user comprises:

communicating the content item to the client device for presentation in an interface that also presents the video content.

4. The method of claim 1, wherein communicating the content item to the client device for presentation to the user in conjunction with the video content in response to the one or more selection processes performed by the online system determining the content item has at least a threshold measure of relevance to the user comprises:

communicating the content item to the client device for presentation at a time when the video content presents the particular object to the user.

5. The method of claim 1, further comprising:

maintaining a minimum time interval associated with the user at the online system;

identifying a time when the content item was presented to the user in conjunction with the video content; and waiting at least a threshold time interval before including another content item associated with an object included in video content in one or more selection processes selecting content for presentation to the user in conjunction with video content.

6. The method of claim 1, wherein the content item specifies a threshold percentage of the particular object visible via the video content, and communicating the content item to the client device for presentation to the user in conjunction with the video content in response to the one or more selection processes selecting the content item comprises:

communicating content item to the client device for presentation to the user in conjunction with the video content when at least the threshold percentage of the particular object is visible via the video content.

7. The method of claim 1, wherein detecting one or more objects included in the video content comprises:

determining the video content is publicly accessible; and detecting the one or more objects included in the video content in response to determining the video content is publicly accessible.

8. The method of claim 7, wherein determining the video content is publicly accessible comprises:

determining the video content has been presented to users of the online system at least a threshold number of times.

9. The method of claim 7, wherein determining the video content is publicly accessible comprises:

determining the video content was provided to the online system by a providing user who has globally authorized users of the online system to access content provided to the user by the online system.

10. The method of claim 7, wherein determining the video content is publicly accessible comprises:

determining the video content was provided to the online system by a providing user connected to at least a threshold number of other users via the online system.

11. The method of claim 7, wherein determining the video content is publicly accessible comprises:

determining one or more permissions associated with the video content by a providing user enable the online system to present the video content to at least a threshold number of users of the online system.

12. The method of claim 1, wherein detecting one or more objects included in the video content comprises:

detecting one or more from a group consisting of: a logo, text data, a product identifier, and any combination thereof included in the video content.

13. The method of claim 1, wherein detecting one or more objects included in the video content comprises:

detecting facial features corresponding to one or more users of the online system included in the video content.

14. A computer program product comprising a non-transitory computer readable storage medium having instructions encoded thereon that, when executed by a processor, cause the processor to:

receive a content item for presentation by an online system, the content item associated with a particular object and targeting criteria identifying users of the online system eligible to be presented with the content item;

obtain, at the online system, video content for presentation to one or more users of the online system;

detect one or more objects included in the video content by the online system extracting objects included in frames of the video content and comparing the extracted objects to information maintained by the online system identifying objects;

store information identifying one or more objects extracted from frames of the video content by the online system;

select the video content for presentation to a user of the online system;

determine the video content includes the particular object in response to the stored information identifying the one or more objects extracted from frames of the video content by the online system matching information identifying the particular object;

determine the user has characteristics satisfying at least a threshold amount of the targeting criteria associated with the content item; and include the content item in one or more selection processes performed by the online system selecting content for presentation to the user in conjunction with the video content in response to the determination the video content includes the particular object in response to the stored information identifying the one or more objects extracted from frames of the video content matching information identifying the particular object and to the determination the user has characteristics satisfying at least a threshold amount of the targeting criteria associated with the content item, the one or more selection processes determining a measure of relevance of the content item to the user based on characteristics of the user maintained by the online system and based on the user's affinity for content items determined by the online system; and communicate the content item to the client device for presentation to the user in conjunction with the video content at times when the particular object is visible in the video content in response to the one or more selection processes performed by the online system determining the content item has at least a threshold measure of relevance to the user.

15. The computer program product of dam 14, wherein communicate the content item to the client device for presentation to the user in conjunction with the video content in response to the one or more selection processes performed by the online system determining the content item has at least a threshold measure of relevance to the user comprises: communicate the content item to the client device for presentation as an overlay on a portion of the video content.

16. The computer program product of claim 14, wherein the computer readable storage medium further has instructions encoded thereon that, when executed by the processor, cause the processor to: maintain a minimum time interval associated with the user at the online system; identify a time when the content item was presented to the user in conjunction with the video content; and wait at least a threshold time interval before including another content item associated with an object included in video content in one or more selection processes selecting content for presentation to the user in conjunction with video content.

17. The computer program product of claim 14, wherein the content item specifies a threshold percentage of the particular object visible via the video content, and communicate the content item to the client device for presentation to the user in conjunction with the video content in response to the one or more selection processes selecting the content item comprises: communicate content item to the client device for presentation to the user in conjunction with the video content when at least the threshold percentage of the particular object is visible via the video content.

* * * * *